United States Patent [19]

Sweeney

[11] 4,331,454
[45] May 25, 1982

[54] EXHAUST FILTER REJUVENATION METHOD

[75] Inventor: William M. Sweeney, Wappingers Falls, N.Y.

[73] Assignee: Texaco Inc., White Plains, N.Y.

[21] Appl. No.: 50,568

[22] Filed: Jun. 21, 1979

Related U.S. Application Data

[62] Division of Ser. No. 20,573, Mar. 15, 1979.

[51] Int. Cl.³ .................. B01J 8/02; F01N 3/15
[52] U.S. Cl. ........................... 55/20; 55/21;
  55/163; 55/208; 55/213; 60/274; 422/178;
  422/223
[58] Field of Search ......... 55/208, 282, 283, DIG. 30,
  55/466, 20, 21, 163, 96, 98, 213, 217, 526;
  422/173, 174, 178, 223; 60/274, 277, 296, 300,
  311; 98/195 SB

[56] References Cited

U.S. PATENT DOCUMENTS

| | | |
|---|---|---|
| 3,238,121 | 3/1966 | Parkin .................... 422/223 |
| 3,889,464 | 1/1975 | Gardner .................. 422/178 |
| 4,009,121 | 2/1977 | Luckenbach ............. 422/223 |
| 4,039,294 | 8/1977 | Mayer et al. ............. 55/DIG. 30 |
| 4,040,253 | 8/1977 | Dhugues et al. ......... 422/174 |
| 4,063,899 | 12/1977 | Chevon et al. ........... 55/DIG. 30 |
| 4,119,706 | 10/1978 | Rogers .................... 44/173 |
| 4,133,654 | 1/1979 | Hill et al. ................. 55/DIG. 30 |
| 4,147,523 | 4/1979 | Izumo ..................... 55/208 |

Primary Examiner—Frank A. Spear, Jr.
Attorney, Agent, or Firm—Carl G. Ries; Robert A. Kulason; Robert B. Burns

[57] ABSTRACT

Method for rejuvenating a smoke filter which is adapted to remove solid particles from an internal combustion engine exhaust gas stream. The filter includes a bed which forms a multi-passage path along which an exhaust stream flows, and in which carbon particles are retained. A heating element incorporated into the filter bed periodically heats the flowing exhaust gas stream as well as the bed. Rejuvenation of the bed by burning off carbon is regulated in response to variations in the gas pressure, and in the bed temperature.

3 Claims, 3 Drawing Figures

EXHAUST FILTER REJUVENATION METHOD

This is a divisional of application Ser. No. 020,573, filed Mar. 15, 1979.

BACKGROUND OF THE INVENTION

In conjunction with the operation of most internal combustion engines there are provided a variety of exhaust gas treating apparatuses or means. These devices by and large embody the purpose of protecting the atmosphere and the environment by treating the exhaust gas in such a manner to remove harmful components.

Such exhaust gas treating devices generally include a unit wherein the hot exhaust gases are received. The harmful components are therein filtered, oxidized, or eliminated through chemical reaction. Thus, as the treated exhaust gas leaves the filter it is relatively harmless, free of solid particles such as carbon which have been burned off, and can be safely discharged into the atmosphere.

Usually, exhaust gas filter, or smoke filters, as they are referred to, are so positioned with respect to the engine to receive the exhaust gas in as hot a condition as possible. Thus, although the exhaust gas as well as the exhaust gas path become heated, the temperature is not always sufficiently high to be effective in burning off carbon particles. This is found to be particularly true when the engine is operated for extended periods at idle or low load conditions.

In the instance of a filter which embodies a catalytic material, the hot exhaust stream is further increased in temperature within the catalyst bed passages. However, said temperature may still be too low to combust the carbon particles which are restrained in the bed.

In the regular operation of an exhaust gas treating unit, while the engine is idling the filter element will be at low temperature and of little effect except to retain solid materials from the exhaust stream. However, at greater speeds or load conditions, the engine will soon discharge a relatively hot exhaust gas stream which, within a short period of time, can reach a temperature of about 700° or 800° F. at the discharge point. To be effective however in burning off carbon particles carried on the exhaust gas stream, the carbon particles should be elevated to a temperature of at least 900° to 1200° F. either in the gas stream or in the filter.

A further detriment experienced in the use of smoke filters designed for automotive applications is the increasing back pressure encountered within the filter. After a period of operation, such a circumstance can result due to the accumulation of carbon particles which tend to restrict and clog flow passages. The overall effect is to plug the filter and consequently decrease the engine's efficiency.

To overcome the above noted difficulties, the present arrangement includes in essence a smoke filter which is particularly adapted for treating and/or burning carbon particles which have been removed from an engine's exhaust gas stream. This is achieved by passing the exhaust stream, or a portion thereof through either a catalytic or a noncatalytic bed. Solid particles will thereby be removed from the stream and retained on the surface of the filter element.

The exhaust gas stream, as well as the particle retaining bed, are initially hot as the stream enters the filter. However, the filter bed is periodically heated by electrical means to a temperature sufficiently high to burn off the retained carbon particles.

An object of the invention therefore is to provide a smoke filter capable of cooperating with an internal combustion engine to treat exhaust gases leaving the latter. A further object is to provide an exhaust gas treatment unit capable of heating the bed of a smoke filter whereby carbon particles which have been removed from the exhaust stream will be readily combusted. Another object is to provide a smoke filter structure which will minimize filter back pressure during engine operation by keeping internal passages relatively clear of carbon particle accumulations.

Figure 1:
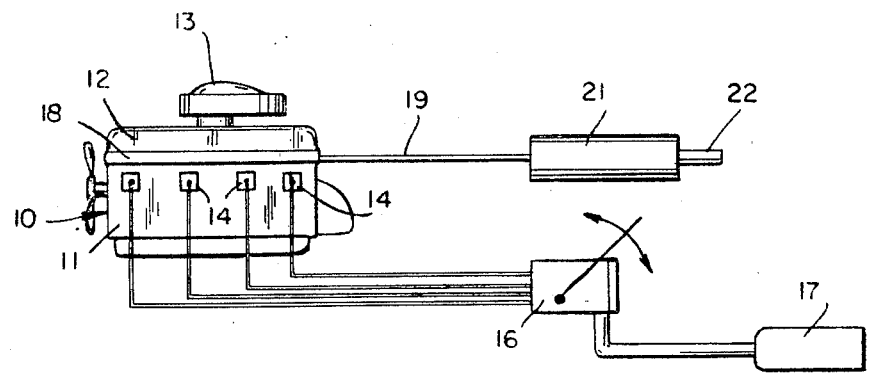
FIG. 1 is an environmental view of a smoke filter of the type contemplated as connected into an internal combustion engine exhaust line.

Referring to the drawings, an internal combustion engine, or a diesel engine of the type to which the present filter is adapted, need be of no particular form so long as sufficient excess oxygen is present in the exhaust stream. The necessary oxygen component is usually present in diesel and stratified charge engines. For illustrating the invention, the engine is operable on a fuel-air charge which is introduced to engine cylinders by either a carburetor system or by direct fuel injection.

Referring to FIG. 1, internal combustion engine 10 includes an engine block 11 embodying a plurality of reciprocally mounted pistons. Inlet manifold 12 is connected to air filter 13 or similar inlet means adapted to receive atmospheric air. An air charge is then directed to the respective combustion chambers on the intake stroke of each piston.

Each cylinder is provided with a fuel injector 14 connected to a pump 16, as well as to a source of fuel 17. Control of the engine under particular speed and load conditions is a function of pump 16. Thus, the amount of fuel injected into each cylinder's combustion chamber on the intake cycle is varied, while the amount of air drawn in is maintained substantially constant.

Hot exhaust gases which result from the combustion event are discharged into an exhaust manifold 18 at a temperature of about 700° to 900° F. The manifold is in turn communicated through conduit 19 to a smoke filter 21. As herein mentioned, the physical or spatial relationship between exhaust manifold 18 and the inlet to filter 21, is preferably minimized. This facilitates the operation of filter 21 by retaining as much heat as possible in the hot exhaust gas stream.

Under normal operation the engine charge will be varied for varying load and speed conditions. The characteristics of the resulting exhaust gas will likewise be varied particularly with respect to temperature. It will further vary in the quantity of the respective constituents which make up the exhaust gas stream.

With regard to the instant arrangement, under varying engine loads, different amounts of smoke will be present in the hot exhaust gas stream, particularly in the instance of a diesel engine. This smoke consists to a large part, of minute particles of unburned carbon. Some of these particles when carried on the gaseous stream are black, discharging a relatively dark smoke. Other particles, however, are invisible.

This hot, smoky exhaust stream is introduced by way of conduit 19 to the inlet end of filter 21. The gas stream is thereby treated by removal or retention of the carbon particles, which stream is subsequently discharged to the atmosphere through exhaust pipe 22.

Figure 2:
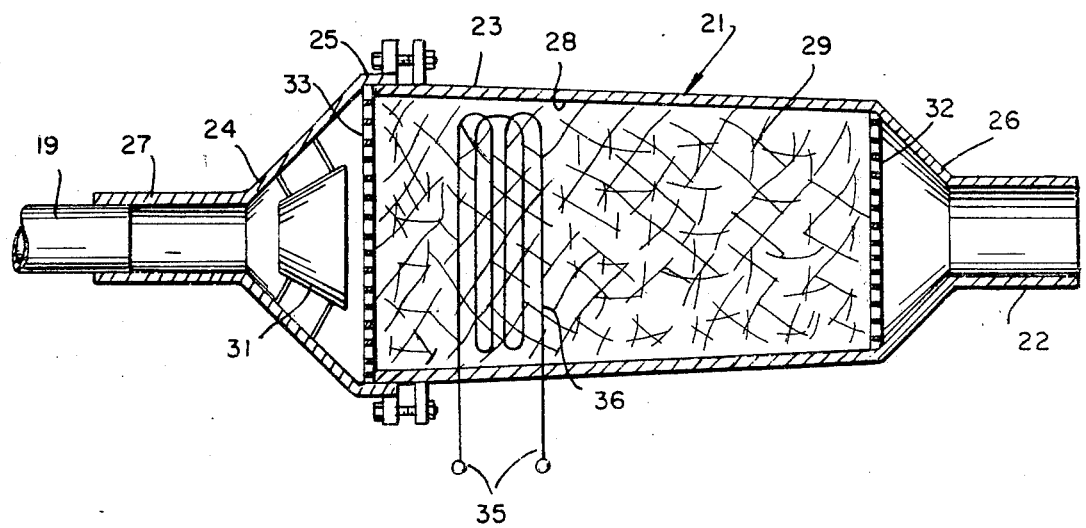
FIG. 2 is a cross sectional view on an enlarged scale of the smoke filter shown in FIG. 1.

Physically, and referring to FIG. 2, the instant smoke filter 21 comprises primarily an elongated casing 23 being preferably cylindrical in cross sectional configuration. The casing, however, can assume a general ellipsoidal or similar cross sectional configuration depending on the position of the filter within, or adjacent to the vehicle frame on which it is carried.

Casing 23 is normally formed of structural sheet metal with welded seams, being capable of withstanding the high temperatures experienced during the gas treating period. Further, it must function even though subjected to external conditions such as continuous exposure to splashing water, weather and the like.

Each respective end of casing 23 is provided with a frusto conical end wall 24 and 26. The spaced apart end walls can be welded or bolted in place to the casing peripheral edges. However, any joint capable of maintaining gas tight integrity of the unit is satisfactory for establishing the filter's substantially closed interior.

To facilitate replacement of internal parts, at least one end of the filter can be provided with a removable closure. As shown, end wall 24 includes a peripheral rim 25 which corresponds to a mating rim on casing 23. The respective elements can thereby be joined with suitable bolts, clamps or the like.

The inlet end wall 24 of the filter 21 is provided with a frusto conical configuration to define a divergent passage between inlet opening conduit 27 and the casing body 23. Said end wall is so shaped, and provided with a suitable connection such as a constricted neck, to be removably connected with the automotive exhaust gas system at conduit 19.

Casing 23 opposed end wall 26 is formed much in the manner of the inlet end 24. Specifically, said end wall 26 includes a converging section which reduces the gas passage from the casing diameter to the diameter of exhaust pipe 22.

The interior of casing 23 which defines an elongated flow compartment 28, is provided with a bed 29 which forms a gas pervious mass comprising a plurality of tortuous passages. Specifically one embodiment of bed 29 comprises a discontinuous mass of steel wool coated with a layer such as alumina. In the alternative, said flow compartment 28 can be provided with a filling of a catalytic material such as a catalyst coated metallic fiber. The filling material is positioned transversely of said compartment and in such manner to substantially fill the latter and function as a contact medium for exhaust gas passing therethrough.

A gas stream diffuser element 31 can be optionally used and preferably disposed inwardly of, and concentric with end wall 24. Said diffuser 31 functions to direct and best distribute gas across the face of filter bed 29. A gas pervious panel 32 is disposed transversely of casing 23 to support the rear wall of bed 29. Said bed 29 as noted, can be formed in a variety of configurations to provide the necessary particle retaining function as gas flows therethrough.

In one embodiment, filter bed 29 is comprised of intermeshed, discontinuous fibers to which a catalyst material has been applied. Thus, solid carbon particles will not only be retained; their combustion will be triggered by the action of the catalytic material. End panel 32 thus physically supports bed 29 even though the latter becomes structurally weakened as a result of the heating process.

Forward panel 33 at the face of the catalyst bed 29, comprises a gas pervious support element. It functions to distribute exhaust gas across the face of bed 29, as well as to support the latter.

Filter heater element 36 is disposed preferably within the filter's reaction compartment in such a disposition or manner to achieve maximum desired heating effect. Thus, and as shown in FIG. 2, the one or more heater units are disposed at the upstream end of reaction chamber 28. When activated, the heater serves to contact and heat both bed 29, as well as the exhaust gas which is passing through the bed.

The actual configuration of heater element 36 is dependent at least to some extent on where the heater or heaters are physically arranged within bed 29. In one embodiment, the heater can be formed in a substantially spiral configuration having an outside diameter approximating the outside diameter of the bed 29. When so formed the heater will be positioned transversely of the reaction compartment and normal to the longitudinal axis of the filter.

Heater unit 36 could in a similar manner extend longitudinally of bed 29 and achieve the desired heating function. In any instance each heater or heaters has at least a pair of terminals 35 which extend through the wall of the filter casing 21 to be accessible to the exterior of the filter. Thus, electrical connections can readily be made or disconnected.

Figure 3:
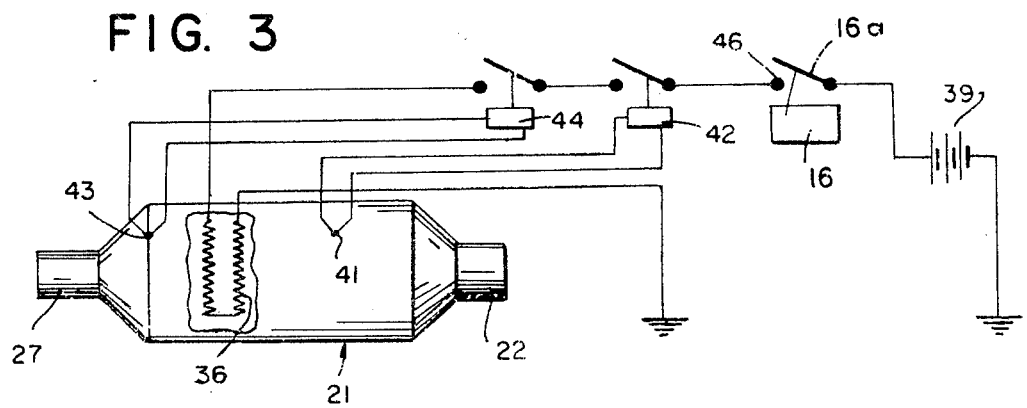
FIG. 3 is a schematic drawing of the filter heating system.

Referring to FIG. 3 the power source for the instant heating system resides in a unit as battery 39. Such a unit is normally found in most internal combustion engines to power both the engine ignition system as well as the filter heater systems.

One or more temperature sensors 41 are located within bed 29 to constantly monitor the temperature condition within both the filter and the bed. In accordance with normal practice, sensor 41 is connected to and regulates the function of a relay or switch 42. Such electrical control means, and their basic mode of operation are well known in the art and can be varied in the instant arrangement without altering the scope of the invention.

Similarly, a pressure sensor 43 is disposed within the filter at a point within the latter where gas pressure build-up will first occur. The latter occurs due to carbon accumulations in bed 29 which block flow paths. Consequently, the pressure could be readily sensed at a point immediately upstream of bed 29.

Sensor 43 is connected to and operates a relay switch 44. Both switches 42 and 44 are connected preferably in series such that both have to be concurrently in closed position in order that the heater circuit might be actuated.

While not shown, both sensors 41 and 43 can be provided with suitable pilot lights or other indicator means visible to an operator. Thus, the latter can readily determine the status of the filter or of the heater circuit at any particular time.

To assure proper burn-off of carbon particles, sufficient oxygen must be provided to filter bed 29. During the rejuvenation period, the engine fuel mixture is adjusted to provide a relatively lean or air rich mixture.

For any particular engine the load imposed on the latter will normally determine the amount of fuel which is injected. Thus, in the present situation the carburetor or the fuel pump 16 is provided with a switch 46. The latter is so set with respect to fuel pump 16 for example, such that the switch will be actuated to the closed position at a time when the pump is adjusted to provide a lean mixture. Normally, for most engines such a mixture would be provided when the engine is running substantially unloaded or idling. For example, a lean mixture would be appropriate on a down-hill run when there is virtually no fuel being fed to the engine.

In any instance switch 46 is so fixed and connected with respect to the carburetor linkage or to the fuel pump 16 actuating arm 16a, that the switch will be urged into the closed position only when the arm 16a is adjusted to conform to the proper engine condition.

When both switches 42 and 44 are closed it can be seen from the circuitry in FIG. 3 that upon the closing of switch 46 at the fuel pump 16, the heater circuit will be completed. Current will then be delivered to heating elements 36.

When this occurs bed 29 will be heated. Further, the exhaust gas stream entering the filter to pass through bed 29 will also be subject to heating. The overall effect will be to raise the temperature of the gas as well as that of the bed. This temperature will be at least to a point where the carbon will be burned off and carried from reaction compartment 23 on the exhaust stream.

At such time as bed 29 is again substantially free of carbon, automatically, the back pressure within the filter 21 will drop. This condition will be detected by sensor 43 and the switch 44 will be actuated to the open position thereby interrupting the heating circuit.

During the burning off of carbon particles, the possibility exists that there will be an excessive or too rapid burning. This circumstance could heat up bed 29 much beyond the temperature at which the carbon will burn. Holding such a temperature for a prolonged period of time could have the adverse effect of damaging the bed, or even damaging the heaters themselves. Consequently, temperature sensor 41 can be adapted to initiate opening of switch 42 at such time as the temperature within the bed rises beyond a predetermined safe level.

In summary, the positioning of switches 42 and 44 as well as sensors 41 and 43 is such as to both activate the heating circuit and to deactivate the same, as is required. Under normal operating conditions however, at such time as bed 29 is freed substantially of carbon particles, a normal flow through of the exhaust gas will be realized. At this point, pressure sensor 43 will detect such condition and automatically open to break the heating circuit.

During this period, the setting of fuel flow by way of fuel pump 16, can be adjusted by the operator. The vehicle in effect will be operating during the entire filter in situ rejuvenation period.

Other modifications and variations of the invention as hereinbefore set forth can be made without departing from the spirit and scope thereof, and therefore, only such limitations should be imposed as are indicated in the appended claims.

I claim:

1. Method for rejuvenating the gas pervious bed (29) of an exhaust gas filter (21) containing an electrically actuated heater element (36), which filter is communicated with an internal combustion engine, into which a fuel/air mixture is introduced, and through which bed (29) a stream of hot exhaust gas is passed whereby to retain combustible particles from said exhaust gas stream on said bed, which method includes the steps of;

sensing the pressure established within said filter by said exhaust gas stream at a point upstream of said gas pervious bed, sensing the temperature within the gas pervious bed, heating said bed to a sufficient temperature to combust carbon particles which have been retained therein in response to a predetermined level of pressure upstream of the bed, and adjusting the fuel/air mixture which is introduced to said internal combustion engine to provide an air rich mixture and consequently to enhance the burning of carbon particles by forming an exhaust gas stream having an excess of combustion supporting gas therein.

2. In the method as defined in claim 1, wherein said air/fuel mixture which is introduced to the engine is adjusted to provide an excessive amount of oxygen in the exhaust gas stream.

3. In the method as defined in claim 1, including the step of; adjusting the composition of fuel charge entering said internal combustion engine by reducing the amount of fuel in the fuel/air mixture whereby to provide an air rich, yet combustible mixture during the carbon particle burning period.

* * * * *